United States Patent
King et al.

(10) Patent No.: US 7,400,346 B2
(45) Date of Patent: Jul. 15, 2008

(54) CAMERA AND PRINTER HAVING SLIDABLY DETACHABLE INTERFACE

(75) Inventors: Tobin Allen King, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 668 days.

(21) Appl. No.: 10/943,905

(22) Filed: Sep. 20, 2004

(65) Prior Publication Data

US 2005/0041106 A1 Feb. 24, 2005

Related U.S. Application Data

(63) Continuation of application No. 10/401,988, filed on Mar. 31, 2003, now Pat. No. 6,795,651, which is a continuation of application No. 09/436,750, filed on Nov. 9, 1999, now Pat. No. 6,539,180.

(30) Foreign Application Priority Data

Nov. 9, 1998 (AU) .................................. PP7017

(51) Int. Cl.
*H04N 5/225* (2006.01)
*G03G 21/16* (2006.01)
(52) U.S. Cl. .............. 348/207.2; 348/376; 399/111
(58) Field of Classification Search ........... 348/207.2, 348/373, 374, 375, 376; 399/110, 111; 347/108, 347/109; 358/909.1
See application file for complete search history.

(56) References Cited

U.S. PATENT DOCUMENTS

| 5,144,340 | A | | 9/1992 | Hotomi et al. | |
|---|---|---|---|---|---|
| 5,493,409 | A | | 2/1996 | Maeda et al. | |
| 5,559,932 | A | | 9/1996 | Machida et al. | |
| 5,802,413 | A | | 9/1998 | Stephenson | |
| 5,848,420 | A | | 12/1998 | Xu | |
| 5,893,662 | A | * | 4/1999 | Ito | 399/110 |
| 5,917,545 | A | * | 6/1999 | Kowno et al. | 348/373 |
| 6,007,195 | A | | 12/1999 | Kokubo | |
| 6,091,909 | A | * | 7/2000 | McIntyre et al. | 348/375 |
| 6,104,430 | A | | 8/2000 | Fukuoka | |
| 6,188,430 | B1 | | 2/2001 | Motai | |
| 6,196,719 | B1 | | 3/2001 | Silverbrook | |
| 6,515,761 | B2 | | 2/2003 | Aoto et al. | |
| 6,628,333 | B1 | * | 9/2003 | Gowda et al. | 348/207.2 |
| 6,795,651 | B2 | * | 9/2004 | Silverbrook | 358/1.6 |
| 7,116,355 | B1 | * | 10/2006 | Omura et al. | 348/207.2 |
| 2001/0035887 | A1 | * | 11/2001 | Altfather et al. | 347/7 |
| 2002/0071051 | A1 | * | 6/2002 | Ikeda | 348/375 |

FOREIGN PATENT DOCUMENTS

| EP | 0848540 A | 6/1998 |
|---|---|---|
| JP | 09-113990 | 5/1997 |
| WO | WO 97/04353 | 2/1997 |
| WO | WO 97/50243 | 12/1997 |

* cited by examiner

*Primary Examiner*—Lin Ye
*Assistant Examiner*—Jason Whipkey (57) ABSTRACT

A digital camera with printer which is configured to print images taken by the camera is provided. The camera includes a casing having an elongate socket having open and closed ends, a first industry standard interface located at the closed end of the socket and a printer unit received within the socket and having a printhead. The printer unit has a second interface compatible with the first interface, whereby the printer unit is detachably engaged with the casing by sliding the unit into the socket to engage the first and second interfaces together.

9 Claims, 11 Drawing Sheets

CAMERA AND PRINTER HAVING SLIDABLY DETACHABLE INTERFACE

CROSS-REFERENCE TO RELATED APPLICATIONS

This is a Continuation Application of U.S. application Ser. No. 10/401,988, filed on Mar. 31, 2003, now issued as U.S. Pat. No. 6,795,651, which is a Continuation Application of U.S. application Ser. No. 09/436,750 filed on Nov. 9, 1999, now issued as U.S. Pat. No. 6,539,180, the entire contents of which are herein incorporated by reference.

FIELD OF THE INVENTION

The present invention relates to camera systems utilizing print on demand printers and in particular discloses a camera with a detachable printer engaged via a PCMCIA slot.

BACKGROUND OF THE INVENTION

It is known for digital cameras to have PC card interfaces of the PCMCIA slot type for Flash memory cards and other forms of digital storage. The Flash cards are typically removed from the camera after being loaded with images and used to transfer those images to a personal computer (PC) or other similar device for printing and possibly for image manipulation.

There are, however, many advantages in 'print on demand' type cameras where the image can be produced from the camera either at the time of taking the photograph or at a later time convenient to the operator.

The inventor of the present invention has also developed a compact portable printer which is directly engageable with the PCMCIA slot in a lap top or notebook computer and that printer is the subject of a co-pending US patent application claiming priority from Australian Patent Application No. PP7019 having a priority date of 9 Nov. 1998. The present invention enables a printer of this type to be utilized in a further situation by incorporation into a print on demand camera.

SUMMARY OF THE INVENTION

The present invention therefore provides a camera device comprising:
a camera having a lens for viewing images, an image sensor for sensing a said image viewed by the lens, image processing means for processing a said image sensed by the image sensor, and a first PCMCIA interface configured to receive a signal from the image processing means; and
a printer unit detachably engaged with the camera so that, when so engaged, the printer unit as a whole and the camera as a whole are substantially immovable relative to each other, the printer unit including
a second PCMCIA interface engaged with the first PCMCIA interface so as to be capable of receiving a said signal from the first PCMCIA interface,
a paper cartridge configured for holding a plurality of individual pages,
a page-width ink jet printhead, and
a paper feed configured to feed one page at a time, from the cartridge past the printhead to enable printing, on the page, by the printhead, of an image corresponding to a said signal received by the second PCMCIA interface.

A further aspect of the invention provides a camera device comprising: a camera having a lens for viewing images, an image sensor for sensing a said image viewed by the lens, image processing means for processing a said image sensed by the image sensor, and a first PCMCIA interface configured to receive a signal from the image processing means; and
a printer unit detachably engaged with the camera so that, when so engaged, the printer unit as a whole and the camera as a whole are substantially immovable relative to each other,
the printer unit having a second PCMCIA interface engaged with the first PCMCIA interface so as to be capable of receiving a said signal from the first PCMCIA interface,
wherein the printer unit is configured to fit within a space conforming to a space occupied by a type III PCMCIA card.

BRIEF DESCRIPTION OF THE DRAWINGS

Notwithstanding any other forms that may fall within its scope, one preferred form of the invention will now be described, by way of example only, with reference to the accompanying drawings, in which.

DESCRIPTION OF THE PREFERRED EMBODIMENT

The print on demand camera system will firstly be described with reference to the detachable printer unit which is engageable with the camera system.

In the preferred form of the invention, a small compact printer is provided which is adapted to print on business card sized sheets of paper and which is sized to fit within the constraints of a PCMCIA type III card (the PCMCIA—Personal Computer Memory Card International Association—sets parameters for so called PC cards with a type III card having a typical size of 85.6 mm by 54 mm and a thickness of 10.5 mm). It will, however, be appreciated that a printer made according to the invention can be of a larger size e.g. to print on 6 inch by 4 inch photo sized paper while still incorporating a direct interface with a PCMCIA slot by way of a PCMCIA interface plug as will be described below.

Figure 1:
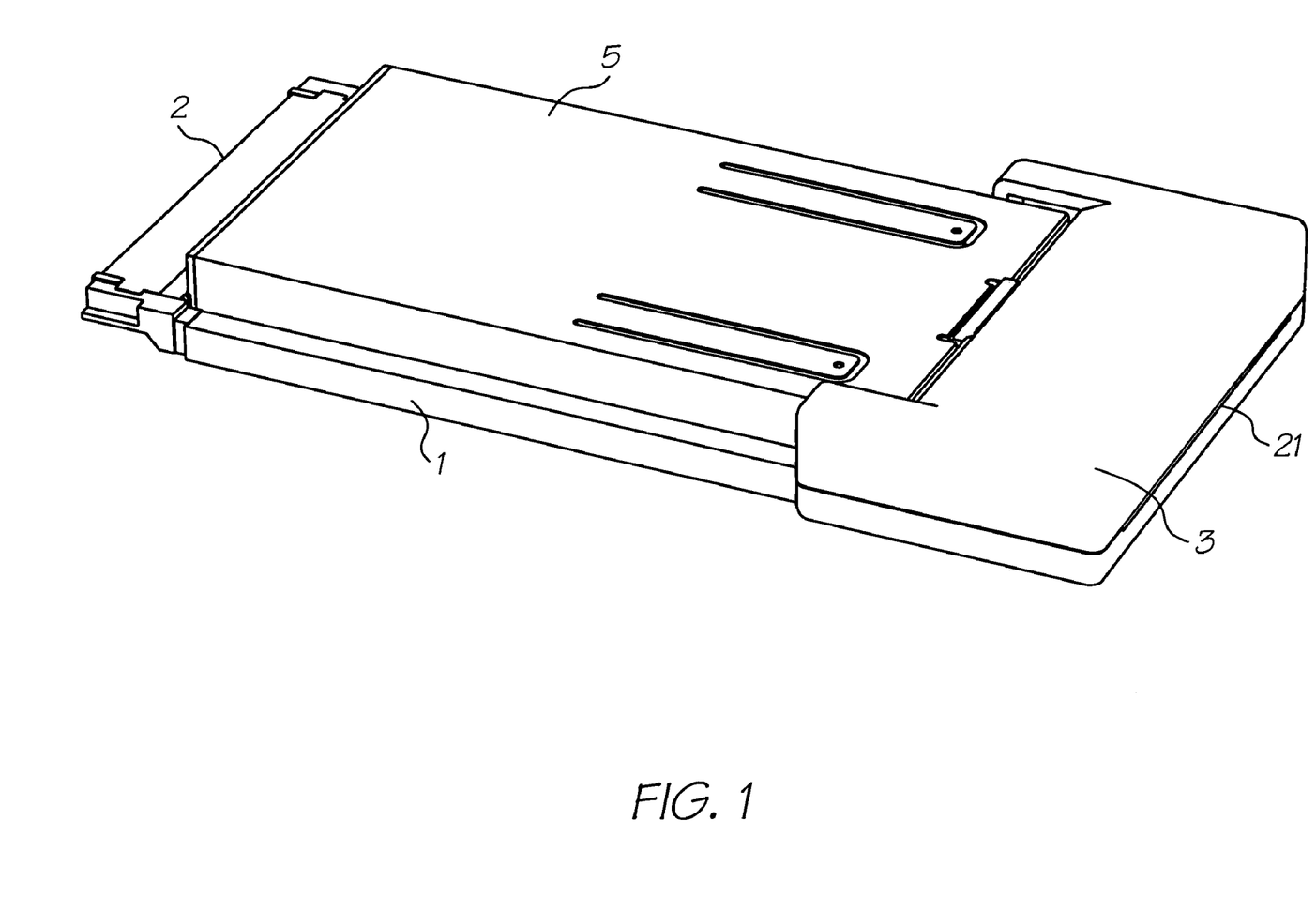
FIG. 1 is a perspective view of a detachable printer unit for use in a print on demand camera system according to the invention.

In the preferred form of the invention the printer unit comprises a support case 1 having a PCMCIA interface plug 2 protruding from one end and a pagewidth ink jet printer 12 extending substantially across the case beneath a cover 3 at the opposite end.

Figure 2:
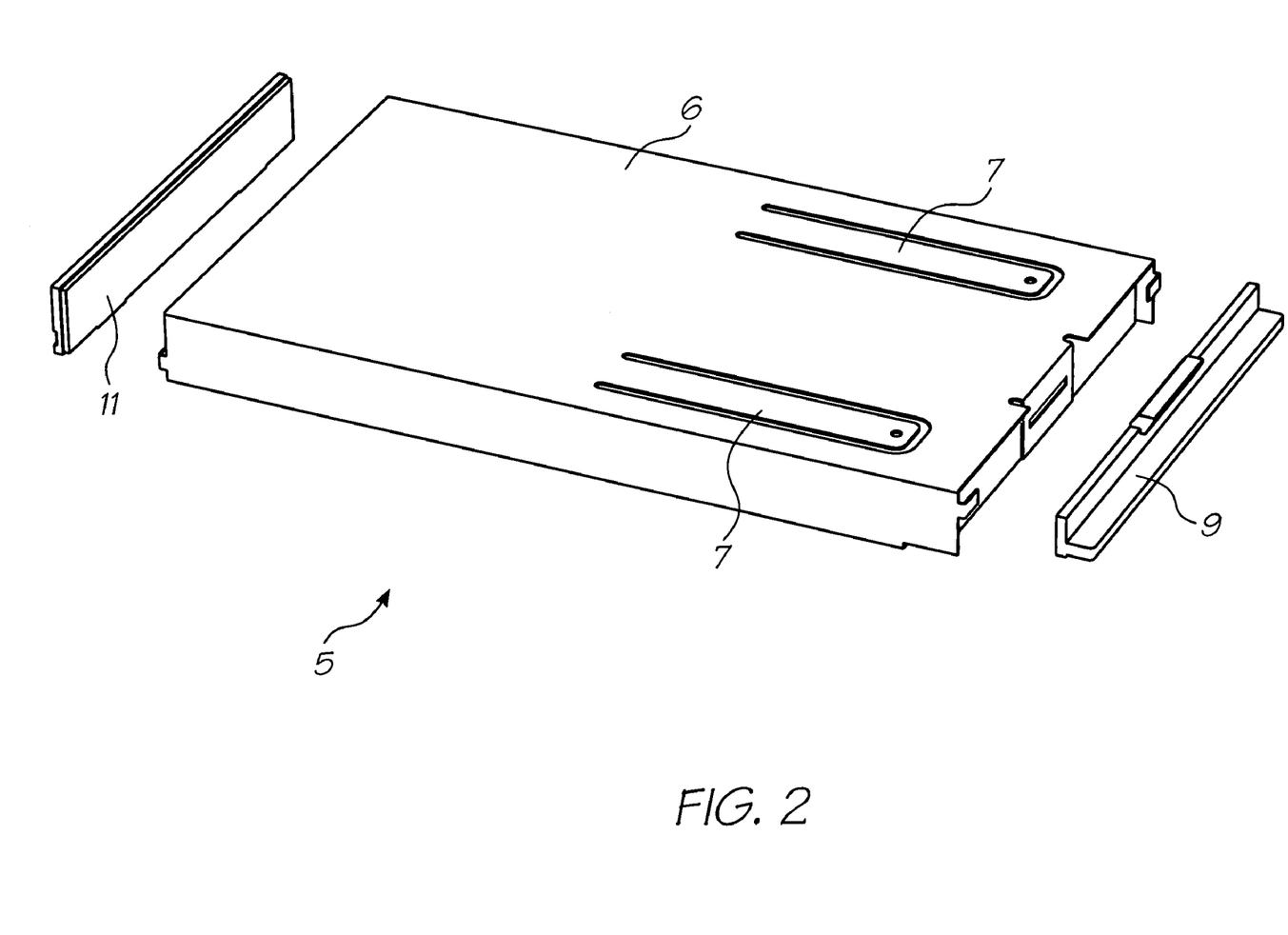
FIG. 2 is a perspective view of the paper cartridge shown engaged with the printer in FIG. 1.
Figure 3:
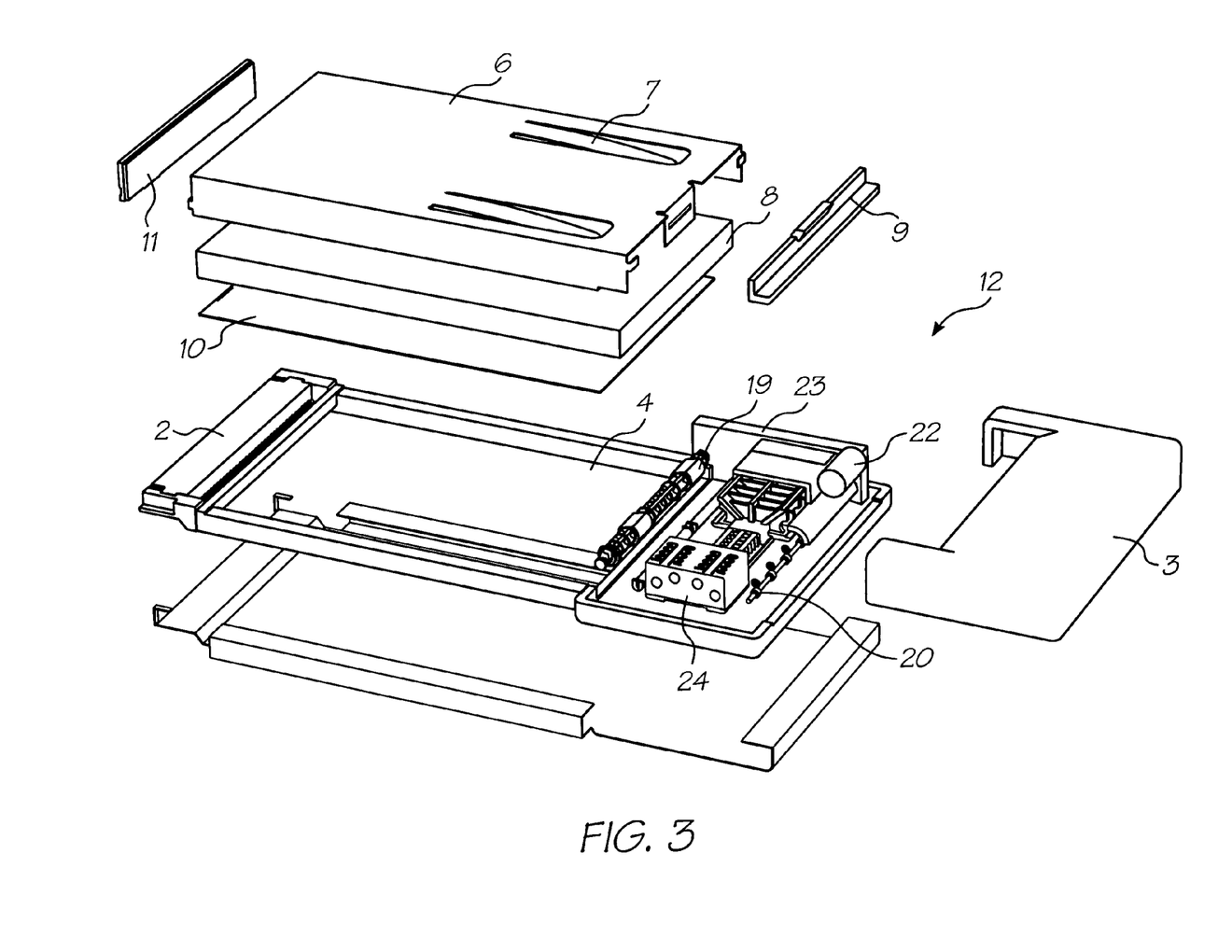
FIG. 3 is an exploded perspective view of the printer and cartridge shown in FIG. 1.

The printer unit incorporates a docking bay 4 adapted to receive a sheet paper cartridge 5 shown in more detail in FIGS. 2 and 3.

The paper cartridge 5 typically has a metal cover 6 incorporating a pair of integral leaf springs 7 arranged to bear against the top of a paper stack 8, forcing the paper downwardly (in the sense shown in FIG. 3) to a lower position, where the lowermost sheet in the stack may be fed out beneath a front molding 9.

The cartridge is completed by a lower base member 10 and a back molding 11.

Figure 4:
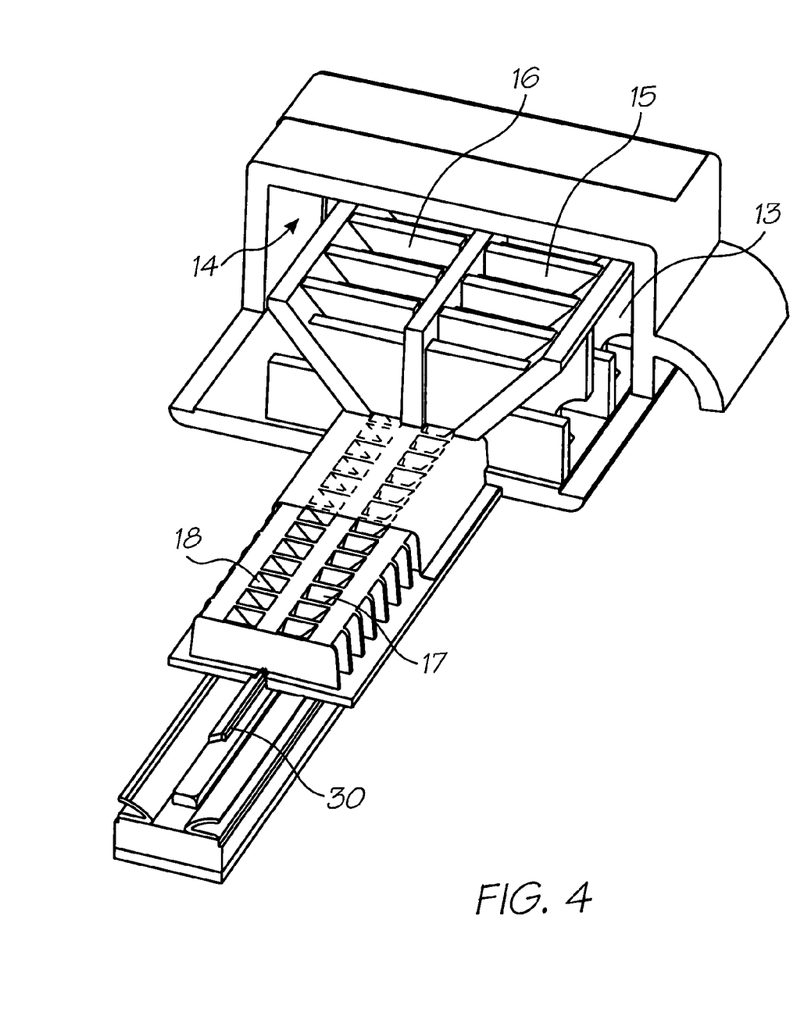
FIG. 4 is a perspective view to an enlarged scale of the printhead and ink reservoir shown in FIG. 3.

The pagewidth printer 12 located beneath cover 3 includes a series of ink channel reservoirs such as those shown at 13 and 14 with one reservoir for each ink color in addition to an additional reservoir of large capacity for black ink. The reservoirs are formed around a printhead 30 with feed channels progressively reducing in size, such as those shown at 15, 16, 17 and 18, feeding the printhead 30 which is formed by chip manufacturing techniques and incorporates CMOS and MEMS technology similar to that disclosed in Australian provisional patent application No. PP6534 filed on 16 Oct. 1998 entitled 'Micromechanical device and method (IJ46a)' assigned to the present applicant and incorporated herein by way of cross reference.

The printer unit further includes rollers 19, 20 arranged to firstly withdraw the lowest sheet from the stack 8 in cartridge 5, forward the sheet across the printhead 30, on demand, for printing, and eject the sheet from the printer unit via exit slot 21. The rollers are driven by an electric motor 22 by way of a gear box 23.

The printer unit is controlled by a printer control chip interconnected between the PCMCIA interface 2 and the printer 12 and this may be incorporated within the printhead at 24 or in a flexible printed circuit board beneath the floor of docking bay 4.

The electronic circuitry to drive the printhead can also include an ASIC (application specific integrated circuit) device which provides for a one-time use of the printer unit before it must be replaced. This circuit, in the form of an 'authentication chip' is preferably similar to that disclosed in international patent application PCT/AU98/00544, also assigned to the present applicant.

The provision of a detachable paper cartridge 5 as a separate item to the mechanism of the printer 12 allows for ready replenishment of paper supplies.

Figure 5:
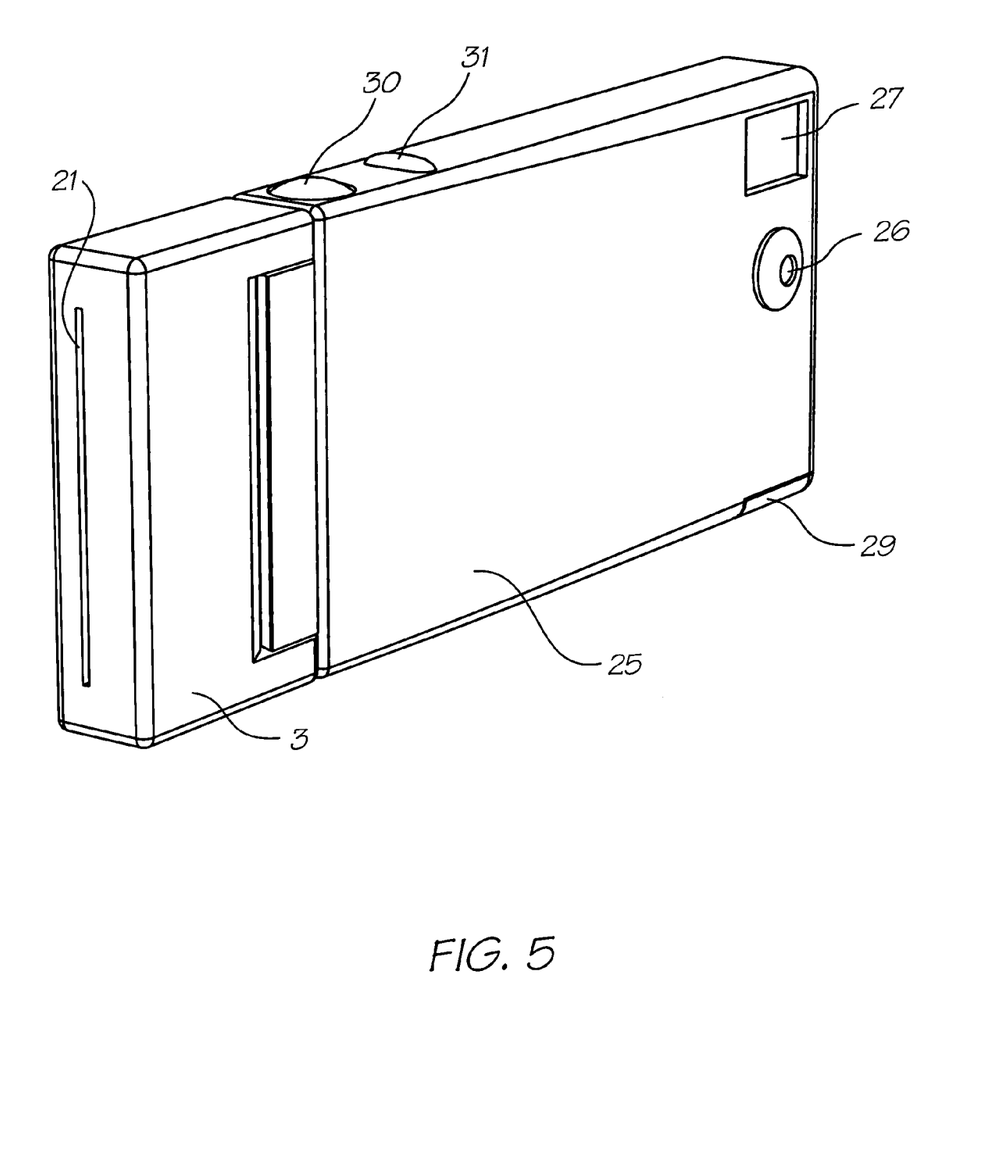
FIG. 5 is a front perspective view of a print on demand camera system according to the invention incorporating the printer shown in FIG. 1.
Figure 6:
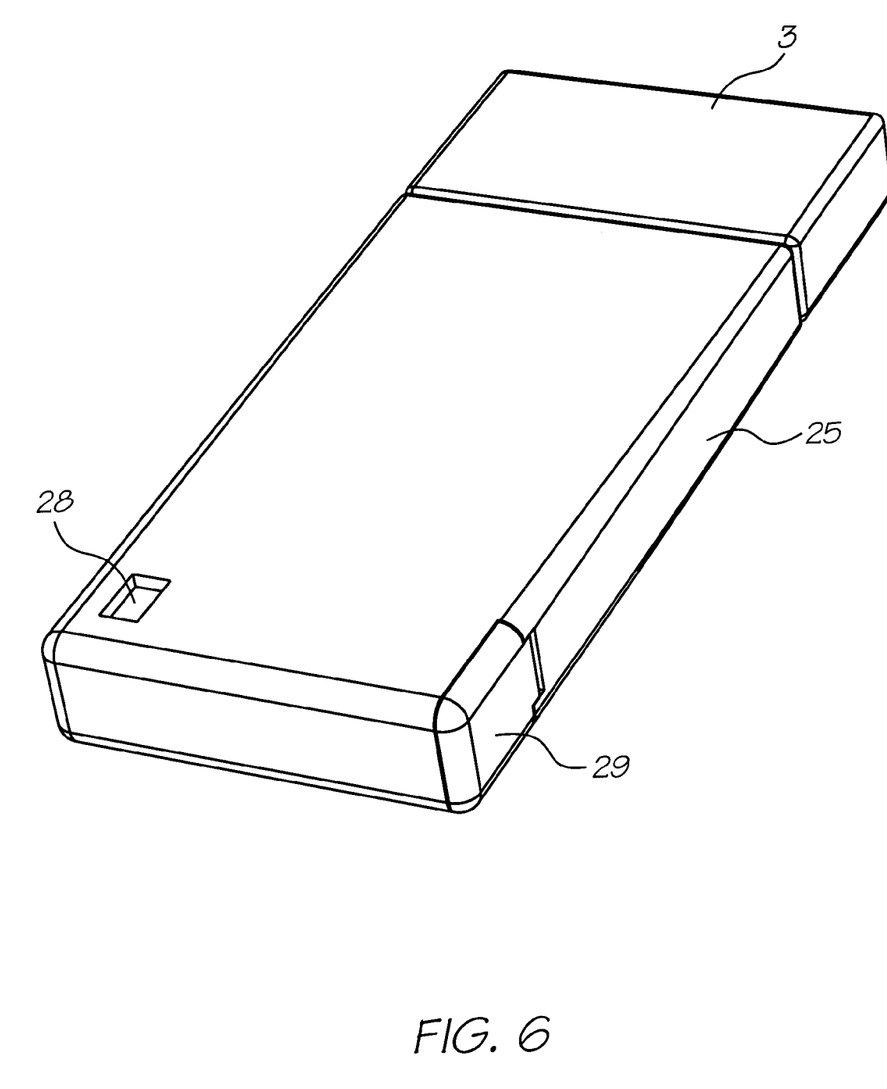
FIG. 6 is a rear perspective view of the print on demand camera system shown in FIG. 5.
Figure 7:
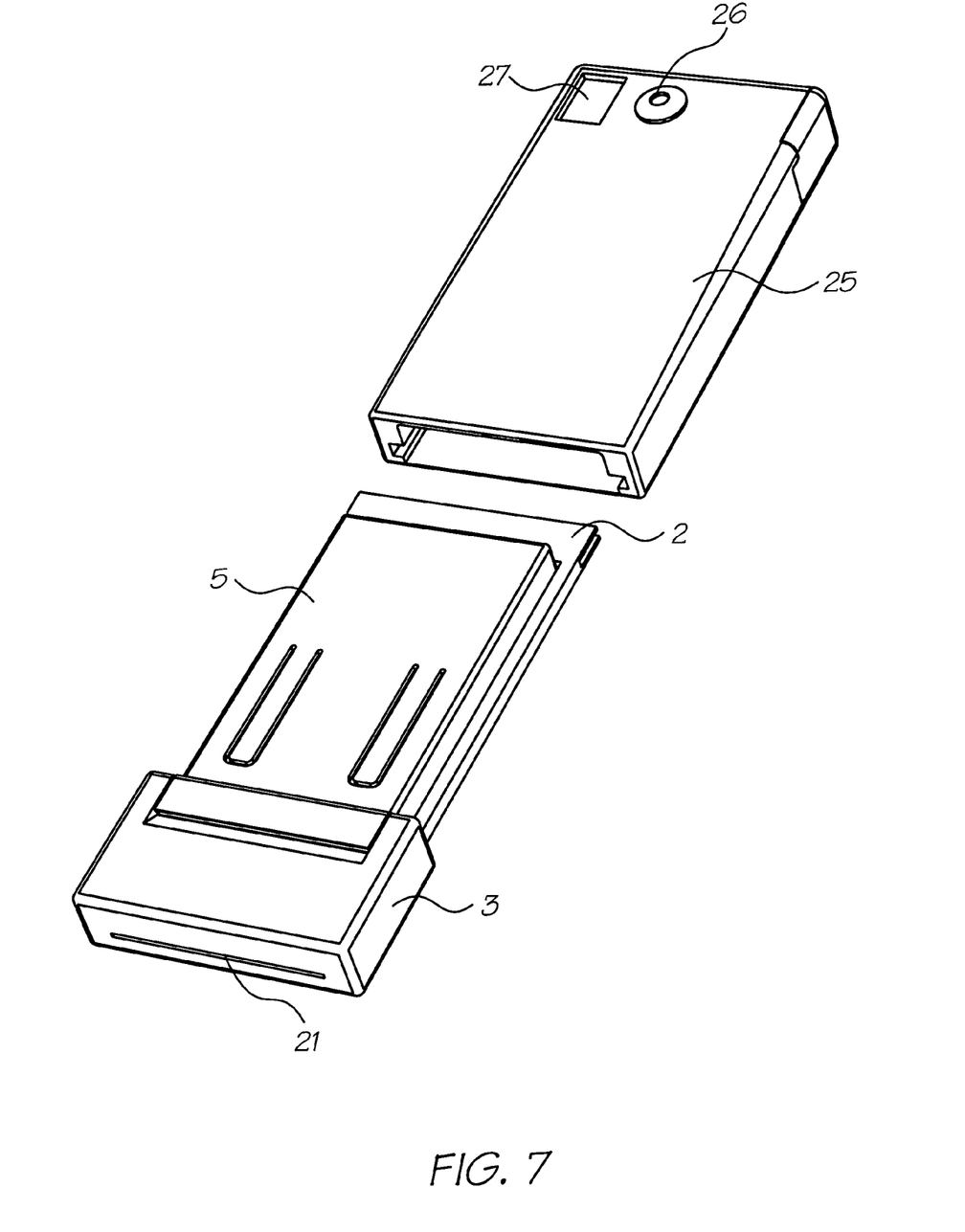
FIG. 7 is similar view to FIG. 5 showing the detachable printer unit removed from the camera unit.

The printer unit is engaged into a camera unit to provide a complete camera system as shown in FIGS. 5 and 6. The camera unit comprises a camera body 25 defining a socket or housing adapted to receive the printer unit, with the cover 3 and its exit slot 21 protruding from the housing.

The camera unit further incorporates a lens 26 and a view finder having a front window 27 and an eye piece 28. A convenient door 29 may be provided for access to the battery or batteries used to power the camera.

The camera unit includes a 'shutter' button 30 and a print button 31 arranged to control operation of the detachable printer unit.

Figure 8:
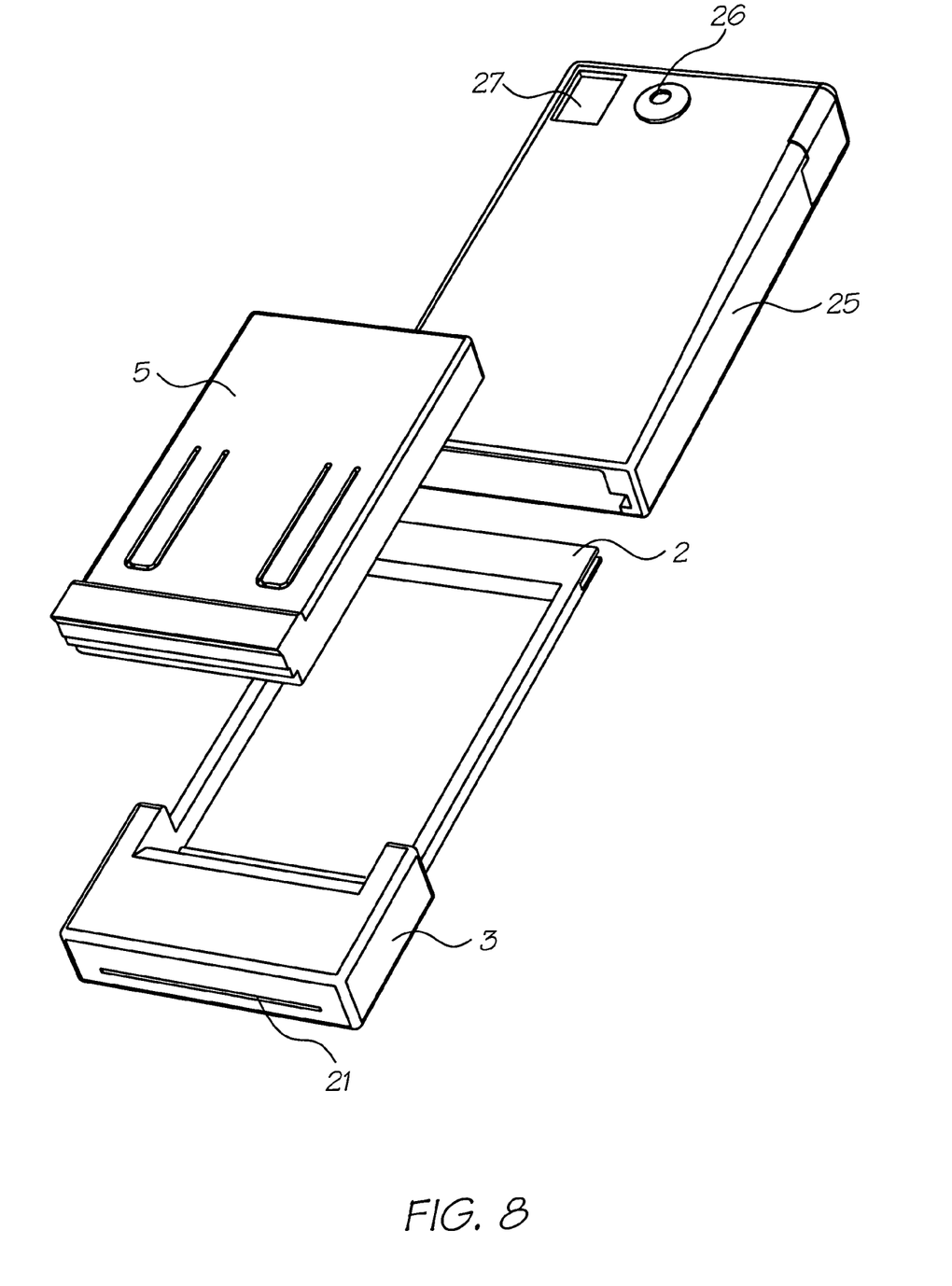
FIG. 8 is a similar view to FIG. 7 showing the paper cartridge removed from the detachable printer unit.

As described above, the paper cartridge 5 is detachable from the printer unit for replenishment of paper as can be clearly seen in FIG. 8.

Figure 10:
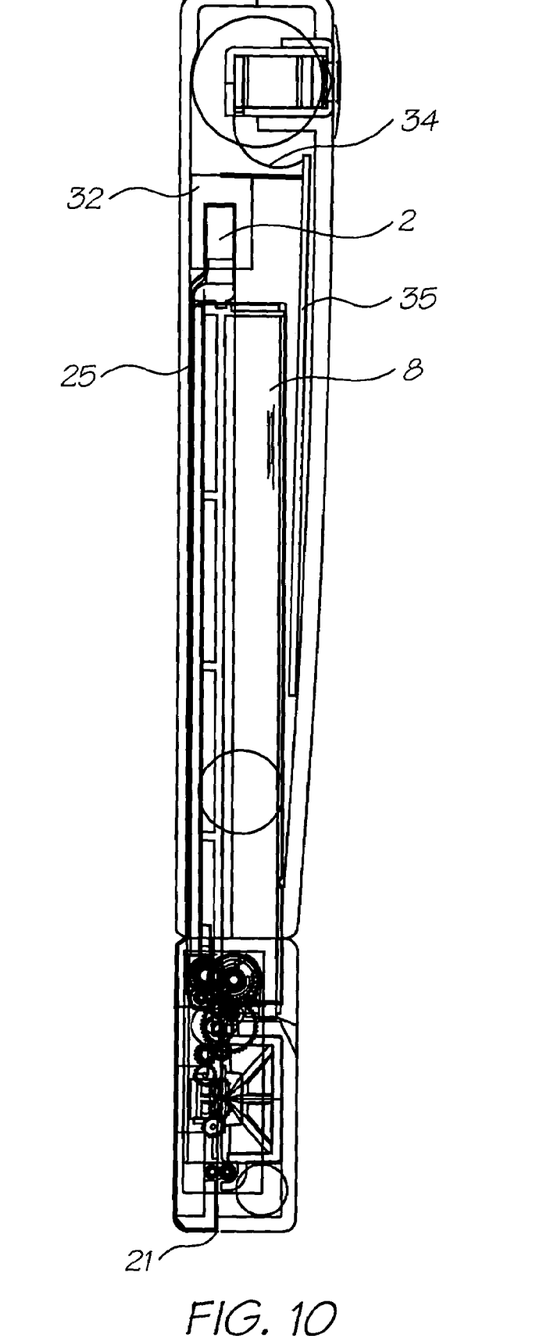
FIG. 10 is a section through the camera system at right angles to the section of FIG. 9.

The interior of the camera body 25 is provided with a PCMCIA slot 32 (FIG. 10) engageable with the PCMCIA plug 2 on the end of the detachable printer unit. When the printer unit is inserted into the camera body, the plug 2 is engaged in the slot 32 providing the appropriate electrical interconnection between the detachable printer unit and the camera unit.

The camera unit further incorporates an image sensor typically in the form of a CCD 33 (FIG. 9) located directly behind the lens 26. The CCD 33 is connected via a flexible PCB 34 to main PCB 35 incorporating image processing means which process the signal from the CCD and transfer it in turn to the PC card slot 32.

Figure 9:
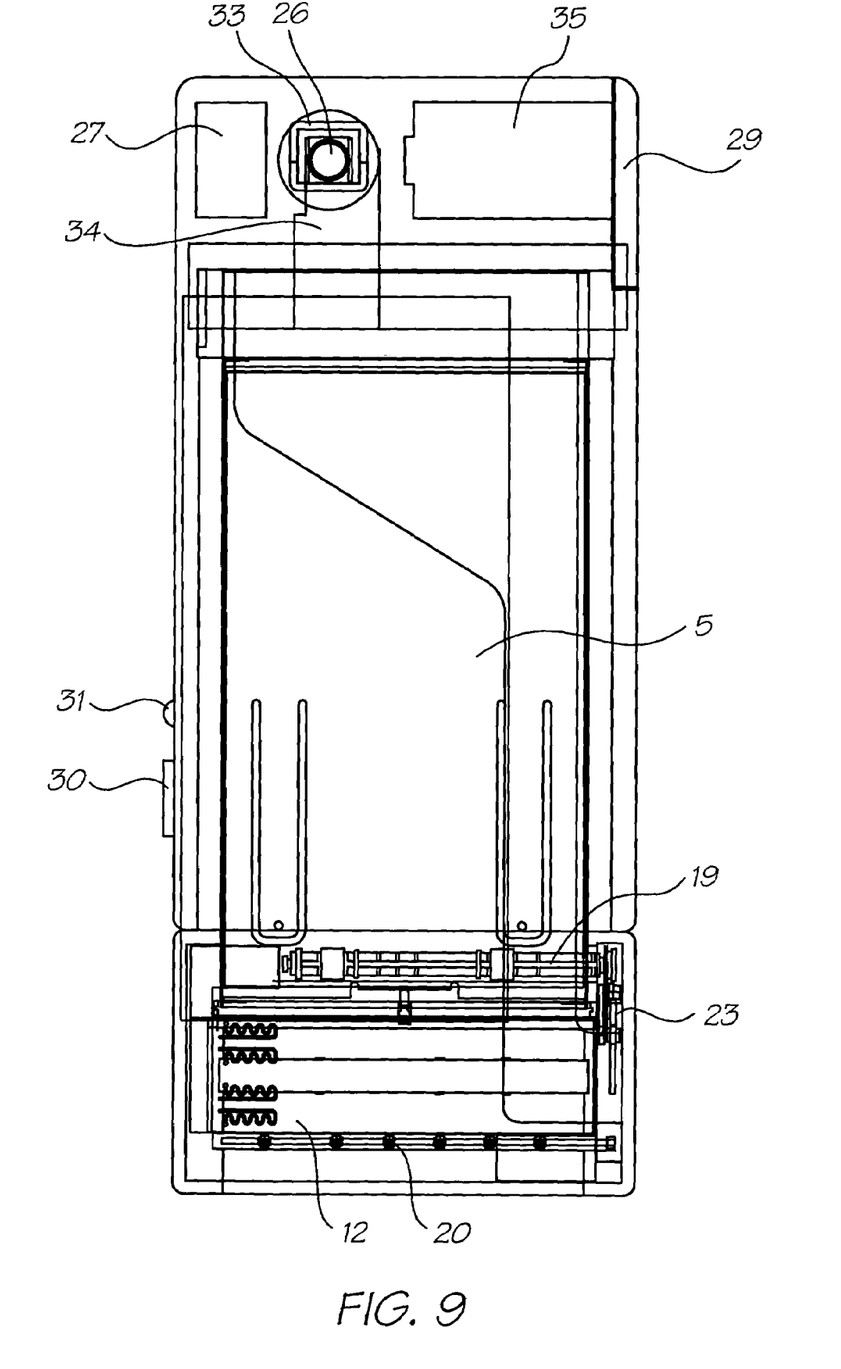
FIG. 9 is a section through the camera system at some depth from the face presented in FIG. 5.

The camera system is powered by a battery 35 inserted through hinged door 29.

Figure 11:
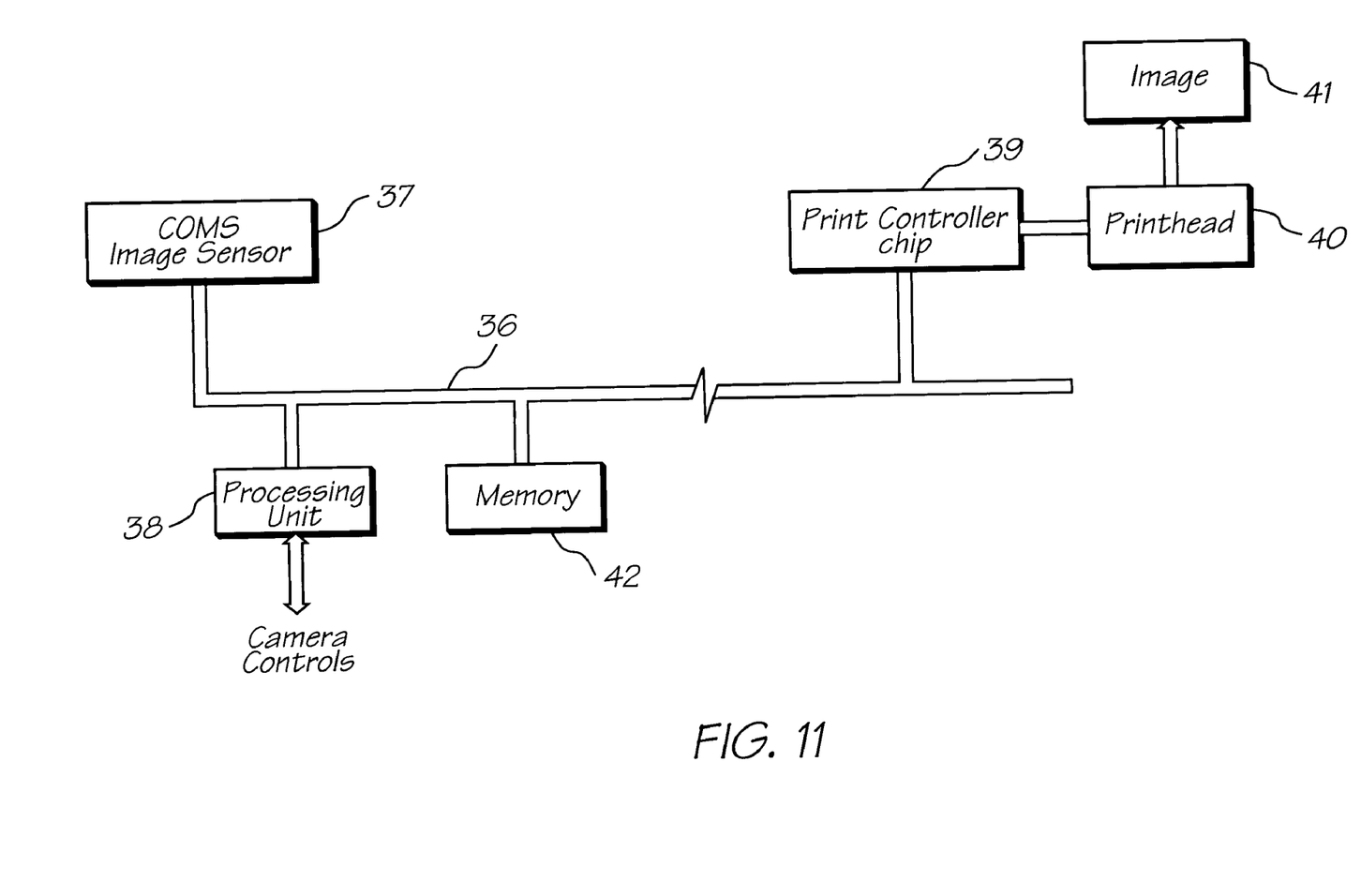
FIG. 11 is a block diagram showing the operational interconnection of the various components of the camera system according to the invention.

Turning to FIG. 11, there is illustrated, schematically, the operational portions of the system which are interconnected by means of a communications bus and include the CMOS image sensor (CCD) 37 which captures a high resolution image via the lens of the camera. A processing unit 38 for processing the image and forwarding it to the printer control chip 39 which is located in the detachable printer unit and in turn controls the printhead 40 to produce the image 41. A memory 42 is utilized for intermediate storage within the camera unit which may also include controls for manipulation of the image before it is transmitted to the printer unit.

In this manner, a print on demand camera system is provided which enables a detachable and multipurpose printer unit to be used to provide photographic prints as required, while also allowing the printer unit to be utilized for other purposes by engagement with other devices via the PCMCIA interface.

It will be appreciated by a person skilled in the art that numerous variations and/or modifications may be made to the present invention as shown in the specific embodiment without departing from the spirit or scope of the invention as broadly described. The present embodiment is, therefore, to be considered in all respects to be illustrative and not restrictive.

The invention claimed is:

1. A digital camera with printer, configured to print images taken by the camera, said camera including:
 a casing having an elongate socket that is open at one end and closed at the other end;
 a first industry standard interface located at the closed end of the socket;
 a printer unit received within the socket, the printer unit having drive circuitry configured to authenticate the printer unit for one-time use and a second interface compatible with the first interface, whereby the printer unit is detachably engaged with the casing by sliding the unit into the socket to engage the first and second interfaces together,
 the printer unit including a printhead for printing of said images upon engagement of the first and second interfaces and authentication of the printer unit.

2. The camera with printer of claim 1 wherein the printer unit further includes a paper cartridge and a paper feed configured to feed one page at a time, from the cartridge past the printhead.

3. The camera with printer of claim 1 wherein the printhead is located outside of the socket.

4. The camera with printer of claim 2 wherein the printer unit includes a carrier that detachably supports the paper cartridge.

5. The camera with printer of claim 4 wherein replacement of the paper cartridge requires detachment of the printer unit from the casing.

6. The camera with printer of claim 1 wherein the printer unit is configured to fit within a space conforming to a space occupied by a type III PCMCIA card.

7. The camera with printer of claim 1 wherein the socket conforms to a socket for a type III PCMCIA card.

8. The camera with printer of claim 1 wherein the printhead is a color-printhead having a plurality of ink reservoirs.

9. The camera with printer of claim 1 wherein the casing has a base and the socket is located in the base,
   wherein the socket conforms to a socket for a type III PCMCIA card,
   wherein the printer unit is configured to fit within a space conforming to a space occupied by a type III PCMCIA card,
   wherein the width of the printer unit and the casing are substantially the same, and
   wherein the depth of the printer unit and the casing are substantially the same.

\* \* \* \* \*